Patented May 5, 1953

2,637,718

UNITED STATES PATENT OFFICE 2,637,718

COPOLYMERS CONTAINING HYDROGEN BONDED DIRECTLY TO SILICON

John B. Rust, East Hanover, N. J., assignor, by direct and mesne assignments, of one-half to Montclair Research Corporation, a corporation of New Jersey, and one-half to Ellis-Foster Company, a corporation of New Jersey No Drawing. Application April 16, 1948, Serial No. 21,572

23 Claims. (Cl. 260—46.5)

This invention relates to copolymers of silicon derivatives and to methods of making the same.

It is known that esters of silicic acid may be hydrolyzed to form first a coherent, glassy mass, and then a silica sand on further removal of the alkoxy groups and dehydration. It is also known that alkyl silicon hydroxides will polymerize on dehydration to produce hard resins if the alkyl radical ratio to silicon is sufficiently low.

Among the objects of the present invention is the production of copolymerization products of organic substituted silicon derivatives or organic substituted silanes with hydrolyzed silicochloroform or related derivatives.

Further objects include the production of copolymers of alkyl silicon derivatives or alkyl silane derivatives with a polymeric derivative having the nature or structure of silicoformic acid, that is, a polymer containing hydrogen bonded directly to silicon.

Further objects include the production of homogeneous composite resins composed of the copolymerization products of silicoformic acid with organic silicon derivatives or silane derivatives, particularly alkyl silicon and silane derivatives.

Still further objects include the production of such composite resins by the utilization of relatively inexpensive materials such as silicochloroform or esters derivable therefrom, such as trialkoxy silane, said products having high heat stability, good color and chemical resistance.

Still further objects include the production of hard, resinous materials from an organo oxy silane such as an alkoxy silane or silicochloroform and a non-resinifying alkyl silicon or alkyl silane hydroxide.

Still further objects and advantages of the present invention will appear from the more detailed description set forth below, it being understood that this more detailed description is given by way of illustration and explanation only and not by way of limitation, since various changes therein may be made by those skilled in the art without departing from the scope and spirit of the present invention.

This application is a continuation-in-part of application Serial No. 611,685 filed August 20, 1945, entitled Copolymers of Silicon Derivatives, now Patent No. 2,511,296, in which the claims are directed to copolymers of a silicohaloform and an organic silicon halide, while in the present application the claims are directed to copolymers of a silicohaloform and an organo substituted alkyloxy or aryloxy silane.

In accordance with the present invention, copolymerization products are produced from a silicohaloform derivative with an organic silicon compound differing from said silicohaloform derivative. The production of such copolymerization products enables the utilization of relatively inexpensive materials such as silicochloroform, in the production of stable, coherent, resinous products having high heat stability, good color, and chemical resistance. The silicohaloform derivative may be represented by the formula $SiHR_3$, where R is halogen or OR' and R' is an organic group, with an organic silicon compound differing from said silicohaloform derivative, the copolymerized organic silicon compound being desirably selected from organic silicon hydroxides, organic silicon halides, organo-substituted alkoxy silanes, etc. Generally it may be said that the invention comprises copolymerization products produced from a silicohaloform or an alkoxy silane cohydrolyzed with an organic substituted silicon or silane derivative so that copolymerization products may be readily produced of the character set forth above. Thus the reaction products are produced from a silicohaloform derivative selected from the group consisting of alkoxy silanes and silicohaloforms with an organic substituted derivative selected from the group consisting of organic silicon hydroxides, organic silicon halides and the like, or with organic substituted silane derivatives selected from the group consisting of alkoxy alkyl silanes and organic silane hydroxides. These copolymerizing compounds of organic silicon or silane derivatives as set forth above, may carry substituted groups such as alkyl, alphyl, aryl, alkynyl, alkenyl, aralkyl, alkanyl, olefinyl, non-aromatic carbocyclic groups and the like, and one or more of such groups may be present as where all of the substituted groups are the same, or different groups are present to produce mixed derivatives. Such substituent groups are illustrated by methyl, ethyl, propyl, butyl, amyl, hexyl, heptyl, octyl, nonyl, decyl, etc., vinyl, allyl, butenyl, cyclohexyl, benzyl, phenyl, tolyl, xenyl, chlorphenyl, styryl, radicals from acetylene, methyl acetylene, propyl acetylene, phenyl acetylene, and the like. Such reactants may be monosilicon derivatives or polysilicon derivatives such as are derivable from disilicon hexachloride, trisilicon octachloride and the like, or chlorosilane derivatives such as disilane tetrachloride, trisilane pentachloride, and the like.

These silane and silicon derivatives in preferred instances may be represented as follows: $RSiCl_3$, $R_2SiCl_2$, $R_3SiCl$, $RR'SiCl_2$, $RR'R''SiCl$, $RSiHCl_2$, R₂SiHCl, RR'SiHCl, and the like, where the various substituent groups represented by R, R', R'' may be the same or different radicals selected from any of the organo groups indicated above. For purposes of illustration, the chlorine derivatives are used but in lieu of chlorine in the formulas set forth above, other halogens or alkoxy groups may be present.

The formulations as illustrated above for reacting components of this invention are not offered by way of limitation but only as a possible explanation, since the invention may be interpolated in view of these suggested formulations; but other theoretical considerations may also come into play.

Various methods and materials may be utilized to produce the copolymerization products of the present invention, all leading however to substantially the same results subject to special variations under particular conditions. Thus the selected reacting materials are copolymerized, for example, by cohydrolysis and codehydration. Various examples will be given below to illustrate such methods without limitation to the scope of the invention other than as defined in the appended claims. The proportions of reactants may vary but there should be present a sufficient amount of the silicohaloform derivative to influence the characteristics of the ultimate copolymerized material to the desired extent. The amount of such haloform derivative present in the copolymer will under some circumstances determine the hardness or viscosity of the final copolymerization product. Thus, with relatively large amounts of silicochloroform in the copolymer, the products are hard, brittle, resinous materials. Decreasing the amount of the silicochloroform or silicochloroform derivative results in softer products which in some cases are liquids.

Thus the nature of the product obtained will be determined by the type of substituent organic group such as alkyl group in the compounds undergoing treatment, by the number of such substituent organic groups, and the proportion of copolymerizing compound used with the silicohaloform specifically silicochloroform; proportions of particular compounds may thus be chosen to control the type of product desired.

In its generic aspect, the silicohaloform employed may contain substituent organo groups as pointed out above, specifically the alkyl derivatives like the alkyl silicochloroforms, such as methyl, ethyl, propyl, butyl, etc. silicochloroforms. Considering such organo substituted silicohaloform derivatives, these may be formulated as $R''_{3-x}SiHR_x$, where R is halogen or OR' and R' is an organic group as set forth hereinabove, and $x$ has the numerical value of 1 to 3, and R'' is an organic group as set forth but more particularly is a lower alkyl group. Such silicohaloforms may thus be utilized for the preparation of copolymers as explained above. Particularly copolymers may be produced from alkyl silicon derivatives such as the alkyl silicon hydroxides, the alkyl silicon halides and the alkyl alkoxy silanes with the alkyl silicochloroform derivatives in which alkyl replaces halogen, cohydrolysis products may be formed, and dehydrated, as exemplified hereinafter. In the alkyl derivatives set forth above, mixed alkyl groups may be present either in one of the stated copolymerizing constituents or both, or mixtures of different alkylated derivatives may be used; and this is true of other organo-substituted derivatives as well as of the alkyl substituted compounds.

The substituent organic groups in both the silicohaloform derivative and the alkoxy silicon reactants are desirably monovalent hydrocarbon groups including particularly aliphatic and aromatic, saturated and unsaturated groups. The ratio of silicohaloform derivative to alkoxy silicon may vary within substantial limits but desirably should lie between the mole ratios of 4:1 and 1:4 with a more restricted range of from 2:1 to 1:3. Desirably there should be sufficient silicohaloform derivative present so that there is present in the copolymer sufficient Si—H bond to influence the characteristics materially.

Hydrolysis may be carried out in any desired way, as for example, by pouring an organic solvent solution of the silicon derivative to be hydrolyzed on ice, or contacting such solution with ice alone or cold water. The organic solvent in such solution may be any solvent, as for example, those set forth herein, including particularly the ethers such as diethyl ether, dimethyl ether, methyl ethyl ether, etc., or the lower ketones such as dimethyl ketone, methyl ethyl ketone, diethyl ketone, etc. The temperature during hydrolysis is generally low, as for example, those obtained with ice or ice-water mixtures and usually will not exceed 5° C. but may be much lower, as for example, —5° C.

Conditions of hydrolysis used are such as not to attack the Si—H bond present. Non-alkaline hydrolysis is preferred. Acids do not hydrolyze the Si—H bond readily. When the alkoxy derivatives containing the Si—H bond are present in the material undergoing hydrolysis, a catalytic amount of alkali may be used and may be removed, as by neutralization, before the Si—H bond is appreciably attacked. Hydrolysis of the halogen containing silicohaloform derivatives may as stated, also be carried out in the presence of alkali without substantial hydrolysis of the Si—H bond if any alkali is neutralized before attack of the Si—H bond.

The presence of the Si—H in the condensed product gives unique properties to the polymer. Thus the hydrogen remaining on the condensed product may be converted to hydroxyl, as for example, by sodium hydroxide, whereby another functional group is introduced. Or such hydrogen may be replaced by halogen which in turn may be replaced by other groups such as the acyl group particularly acyl groups derived from monocarboxylic acids, i. e., fatty acids. The hydrogen to silicon ratio in the polymers may be from 0.20 to 1.0 and the ratio of total hydrocarbon to silicon in the polymers may be from 0.3 to 2.5.

The substituted silanes such as alkoxy silicons employed herein for producing copolymers with the silicohaloform derivative, will be such silanes that do not contain an Si—H bond and will have the general formula $R^4_{4-x}Si(OR^3)_x$, where $x$ is from 1 to 3, $R^3$ is a monovalent hydrocarbon group, aliphatic or aromatic, saturated or unsaturated, particularly alkyl or aryl groups, bonded through carbon in said groups to the oxygen, and $R^4$ is selected from any of the same groups as $R^3$ but is bonded through carbon to the silicon. Such silanes include particularly arkyloxy silanes, arkyl meaning either alkyl or aryl and exemplifying the silanes that may be used herein the following are mentioned: alkyl alkoxysilanes, particularly where the alkyl groups contain from 1 to 6 carbon atoms such as trimethyl - methoxysilane, trimethyl - ethoxysilane, trimethyl-butoxysilane, dimethyl-diethoxysilane, dimethyl-dibutoxysilane, diethyl-diethoxysilane, methyl-triethoxysilane, methyl-tributoxysilane, ethyl-trimethoxysilane, ethyl-triethoxysilane, isopropyl-triethoxysilane, isobutyl-triethoxysilane, isoamyl-triethoxysilane, hexyl-triethoxysilane; aryl alkoxy silanes where the alkyl in the alkoxy group is any alkyl group as set forth above and aryl is phenyl, tolyl, aralkyl or alkaryl, for example phenyl triethoxysilane, benzyl triethoxysilane, etc.; alkylaroxysilanes where the alkyl and aryl groups are as set forth above, for example, ethyl triphenoxysilane, etc.; arylaroxysilanes where the aryl group is as set forth above, for example phenyltriphenoxysilane; and arkyloxysilanes where a substituent group is unsaturated, for example allyltriethoxysilane, phenylethynyl-triethoxysilane, diphenylethynyl-diethoxysilane, etc. Any of these silanes as given above may be substituted for the alkoxysilanes as given in the specific examples.

In the following illustrative examples, all parts are given by weight.

Example 1.—Two parts of silicochloroform and three parts of methyl silicon trichloride were added to 15 parts of diethyl ether. The ether solution was then poured on ice. The hydrolyzed product remained in the ether layer and the mixture was separated from the water and dried over sodium sulfate. A sample of the product was poured on a glass plate. After evaporation of the ether a clear film was obtained which hardened in a few minutes.

Example 2.—One part of silicochloroform and one part of di-n-butyl silicon dichloride were placed in 10 parts of ether. The resulting mixture was hydrolyzed by pouring it on ice. The ether layer was separated and dried over $Na_2SO_4$. A film, poured on a glass plate, was heated to 170° C. for 4 hours. A clear, hard film was thus obtained.

Example 3.—One part each of silicochloroform, methyl silicon-trichloride and di-n-butyl silicon dichloride were placed on 15 parts of ether. The mixture was hydrolyzed by pouring on ice. It was then separated and dried over $Na_2SO_4$. A film, poured on a glass plate, was heated for 3 hours at 150° C. A clear, hard film was obtained.

Example 4.—One part of a crude mixture obtained in the preparation of silicochloroform (essentially 80% silicochloroform and 20% silicon tetrachloride) and two parts of di-n-butyl silicon dichloride were placed in 10 parts of ether. The mixture was hydrolyzed by pouring on ice. It was separated from the water layer and dried over $Na_2SO_4$. A film was poured on a glass plate and left at 50° C. for 16 hours. A clear, non-tacky, soft film was obtained.

Example 5.—One part of silicochloroform and one part of phenyl silicon trichloride were placed in 10 parts of ether. The mixture was hydrolyzed on ice, separated from the water and dried over $Na_2SO_4$. A film, poured on a glass plate, was heated at 140° C. for 2 hours. A clear, hard film was obtained.

Example 6.—One part each of silicochloroform, phenyl silicon trichloride and di-n-butyl silicon dichloride were mixed and added to 15 cc. of ether. The mixture was hydrolyzed by pouring on ice. It was separated from the water layer and dried over $Na_2SO_4$. A film, poured on a glass plate, was heated at 140° C. for 2 hours. A clear, hard film was obtained.

Example 7.—One part of mono-n-butyl dichlorosilane and one part of dichlorosilane were added to 10 parts of ether. The mixture was poured on ice and the ether layer was separated and dried over $Na_2SO_4$. A portion of the product was poured on a glass plate. The plate was heated for two hours at 120° C. A clear, hard film was obtained.

Example 8.—One part of mono-n-butyl dichlorosilane, one part of di-n-butyl silicon dichloride and two parts of ethyl silicon trichloride were added to 10 parts of ether. The mixture was hydrolyzed by pouring on ice and the ether layer was separated and dried over $Na_2SO_4$. A sample was poured on a glass plate and the plate was heated for 2 hours at 120° C. A soft, sticky film was obtained. Heating was continued for another hour at 160° C. A clear, hard film was obtained.

Example 9.—One part of mono-n-butyl dichlorosilane and one part of methyl silicon trichloride were added to 10 parts of ether. The mixture was poured on ice and the ether layer, containing the silicol mixture, was dried over $Na_2SO_4$. A sample poured on glass, was heated at 120° C. for 2 hours. A clear, hard film was obtained.

Example 10.—Two parts of mono-n-butyl dichlorosilane and one part of silicon tetrachloride were added to 10 parts of ether. The mixture was hydrolyzed by pouring on ice. The ether layer was separated and dried over $Na_2SO_4$. A portion of the mixture was poured on a glass plate and heated at 160° C. for 2 hours. A clear, hard film was obtained.

Example 11.—Three parts of triethylsilicon-monochloride and three parts silicochloroform were mixed with thirty parts of ethly ether and hydrolyzed by vigorous stirring with 100 parts of crushed ice. After coming to room temperature the ether layer was separated and dried over sodium sulfate until solution was clear. Fifty parts of ethyl acetate were added to the solution and the ether was distilled off, together with twenty parts of the ethyl acetate. From the resulting solution films were poured on glass and baked in the oven for one hour at 150° C. Hard brittle films were formed.

Example 12.—In this example a hydrolyzed amyltrichlorosilane ($C_5H_{11}SiCl_3$) and hydrolyzed diphenylchlorosilane (($C_6H_5$)$_2SiHCl$) are copolymerized.

10.3 g. (.05 mole) of amyltrichlorosilane was hydrolyzed and mixed with 4.5 g. (.023 mole) of hydrolyzed diphenylchlorosilane in a test tube. Nitrogen was blown through it while heating for 1 hour at 100° C. and then for 2 hours at 170–173° C.; but at this time the liquid became viscous. A 50% benzene solution was made up and films were cast. Films were heated in an oven for ½ hour at 130° C., ½ hour at 150° C. then 2 hours at 170° C. The plates were still greasy to the touch at the end of this time.

Example 13.—In this example a hydrolyzed amyltrichlorosilane ($C_5H_{11}SiCl_3$) and hydrolyzed diphenylchlorosilane (($C_6H_5$)$_2SiHCl$) are copolymerized.

10.3 g. (.05 mole) of amyltrichlorosilane was hydrolyzed and mixed with 10 g. (.05 mole) of hydrolyzed diphenylchlorosilane in a test tube. Nitrogen was bubbled through while heating for 1 hour at 100° C. and 2 hours at approximately 170° C. The original thin liquid became viscous. 50% solid benzene solution was made up and a film cast on glass plate. After baking for 1 hour at 130°–150° C. and 2 hours at 170° C. the plate was still greasy to the touch.

A part of the benzene solution was treated with

25% sodium hydroxide solution. Copious quantities of hydrogen were given off on shaking. The benzene layer was then decanted and washed with water. A film was cast and cured in the same manner as above and gave comparable results.

*Example 14.*—In this example hydrolyzed diethyldichlorosilane ($C_2H_5$)$_2$SiCl$_2$) is copolymerized with hydrolyzed dibenzylchlorosilane $$(C_6H_5CH_2)_2SiCHl)$$

7.5 g. (.062 mole) of diethyldichlorosilane was hydrolyzed and mixed with 4.5 g. (.02 mole) of hydrolyzed dibenzylchlorosilane. To this mixture was added 1% (.12 gms.) by weight of oxalic acid and a drop of concentrated HCl. The mixture was put in a test tube and nitrogen was bubbled through while heating for 3 hours at 170° C., 1½ hours at 200° C. and 1 hour at 210–220° C. A benzene solution was made out of the silicone and a film was cast. This film cured hard after baking for 3 hours at 220° C.

Part of the above benzene solution was treated with 10% caustic soda. A slight evolution of gas was noted and the benzene solution was washed with water three times then dried over anhydrous sodium sulfate and a film cast. This film cured soft in 2 hours at 215°–220° C.

*Example 15.*—In this example ethyldiethoxysilane ($C_2H_5SiH(OC_2H_5)_2$) was cohydrolyzed with cyclohexyltrichlorosilane ($C_6H_{11}SiCl_3$).

3 g. (.02 mole) of ethyldiethoxysilane was mixed with 9 g. (.04 mole) of cyclohexyltrichlorosilane and 12 g. of heptane. The mixture was hydrolyzed with 20 g. of ice. 20 cc. of ether and 25 cc. of chloroform were added to the mixture and the organic layer removed and dried over anhydrous sodium sulfate. The solution was removed and concentrated and then a film was cast. A film was heated for ½ hour at 135° C. and for 2 hours at 150° C. and cured to a soft film.

*Example 16.*—In this example ethyldiethoxysilane ($C_2H_5SiH(OC_2H_5)_2$) is cohydrolyzed with partially hydrolyzed butyltriethoxysilane.

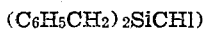
$$(C_4H_9Si(OC_2H_5)_3$$

9 g. (.02 mole) of 50% benzene solution of partially hydrolyzed butyltriethoxysilane was mixed with 3 g. (.02 mole) of ethyldiethoxysilane and 12 g. of dioxane. This mixture was then hydrolyzed by adding it to 25 cc. of 10% HCl solution. The upper layer was decanted and a film poured. After heating for 2½ hours at 135° and 2 hours at 150° the film was still tacky. After 1 hour more at 200° the film cured hard.

*Example 17.*—In this example ethyldiethoxysilane ($C_2H_5SiH(OC_2H_5)_2$) is copolymerized with diallyl diisobutoxysilane ($C_3H_5$)$_2$Si(O-isoC$_4$H$_9$)$_2$.

6 g. (.04 mole) of ethyldiethoxysilane was mixed with 10.4 g. (.04 mole) of diethyldiethoxysilane and 16 g. of acetone. The mixture was then poured into 25 cc. of 10% aqueous HCl solution. Two layers formed. The upper layer was washed with bicarbonate solution then diluted with ether and dried over anhydrous sodium sulfate. Films were cast. One plate cured to brittle film after baking for ½ hour at 200° C. Another plate was still soft after baking for 1 hour at 135° C. but cured to a brittle film after 1½ hours at the same temperature.

*Example 18.*—In this example diethyl di-n-propoxy silane (($C_2H_5$)$_2$Si(O-n-C$_3$H$_7$)$_2$ was cohydrolyzed with ethyl dichlorosilane

$$(C_2H_5SiHCl_2)$$

10.4 grams (0.05M) of diethyl di-n-propoxy silane (Et$_2$Si(O-n-Pr)$_2$ cohydrolyzed with 6.5 gms. (0.05M) of ethyl dichlorosilane (EtSiHCl$_2$) by diluting a mixture of the two with 5 milliliters of diethyl ether and dropping this solution, with constant stirring, into a solution of 7 cc. of water in 10 cc. of dioxane, kept cold throughout the reaction with an ice salt bath. The upper layer containing the silicone was separated and washed with water until acid free and dried over anhydrous sodium sulfate. Films were poured onto glass plates and baked at 150° C. After 4 hours of baking, the silicone was still liquid. Continued baking for 4 hours gives a dry but soft film. Twenty hours more of baking at 150° did not change the character of the film.

The materials of the present invention may be used for a large number of applications. They may be dissolved in a solvent or composite solvent and used as lacquers, varnishes, impregnating varnishes, insulating varnishes, protective coatings, molding compositions, and the like. For such purposes they may be blended with other components such as natural resins including rosins, copal, shellac, etc., as well as synthetic resins including urea aldehyde, specifically urea formaldehyde, phenol aldehyde, melamine, aniline aldehyde, acetone formaldehyde, alkyd, cumarone-indene, resins, vinyl resins, and polymerized vinyl derivatives, allyl dibasic acid resins, acrylate and methacrylate resins, and with various cellulose derivatives including the ethers and esters, such as nitrocellulose and the organic esters of cellulose such as cellulose acetate, and the like, as well as with drying, semi-drying, and non-drying oils. These utilizations apply to the products whether partially polymerized or completely polymerized depending on the utilization that is to be made of the derivatives. They may be used as lubricating oils, or as additives to hydrocarbon oils for lubricating purposes, and for inclusion with the vegetable oils, particularly the drying oils such as linseed oil and Chinawood oil, and the semi-drying oils such as soya bean oil, etc., as well as the non-drying oils including castor oil. With the vegetable or other glyceride oils they may be blended as by cooking. Various combinations of the indicated derivatives set forth above may be utilized for particular purposes.

They may be used in view of their electrical properties, in the production of varnishes or coatings for electrical insulation, as dielectric liquids, etc. They may be employed in the production of laminated products for bonding together two or more sheets of the same or different organic or inorganic materials.

For production of molding compositions, organic or inorganic fillers, may be impregnated with the polymerized or partially polymerized materials and utilized for molding purposes, as for example, in hot pressing operations. Fillers for these purposes may be inorganic materials, such as the various inorganic fillers, mica, clays, asbestos, or the organic fillers including cellulose products, such as wood or wood fibers, cellulose fibers of various types, paper, etc.

As solvents for the products of the present invention to produce solutions for any of the purposes set forth above as in the production of lacquers, varnishes, impregnating compositions, coating compositions, or in the use of solutions of such reaction products for impregnation of fillers for hot pressing operations, etc., or for the production of solutions of such reaction products to preserve them for future use, a variety of solvents may be employed. Such solvents include hydrocarbon solvents, both aliphatic and aromatic such as hexane, benzene, toluene and so forth, ethers such as dimethyl, diethyl, diisopropyl, dibutyl ethers and cyclic ethers such as dioxan or diethers such as diethyl ether or ethylene glycol or mixed ethers, esters such as ethyl, butyl or amyl acetates, propionates, butyrates and the like. Solvents may be added during the reaction itself or at a later stage. When the use of a solvent is desired, it is sometimes advantageous to add the solvent to the reaction mixture before it is poured on ice when hydrolysis is being carried out.

Having thus set forth my invention, I claim:

1. An Si-H bond containing copolymer formed by cohydrolysis by water of any halogen and OR' groups present only of a silicohaloform derivative having the formula $$R^2_{3-x}SiHR_x$$

where R is selected from the group consisting of halogen and OR' and R' is a monovalent hydrocarbon group, $R^2$ is a monovalent hydrocarbon group, and $x$ is from 1 to 2, with a substituted silane having the formula $$R^4_{4-y}Si(OR^3)_y$$

where $R^3$ and $R^4$ are monovalent hydrocarbon groups and $y$ is from 1 to 3, the mole ratio of the silicohaloform derivative to the substituted silane being from 4:1 to 1:4.

2. The copolymer of claim 1 in which R is halogen.
3. The copolymer of claim 1 in which R is OR' and R' is a monovalent hydrocarbon group.
4. The copolymer of claim 1 in which $R^3$ is alkyl.
5. Codehydration products of the cohydrolysis products of claim 1.
6. Codehydration products of the cohydrolysis products of claim 1 in which R is halogen.
7. Codehydration products of the cohydrolysis products of claim 1 in which R is OR' and R' is a monovalent hydrocarbon group.
8. Codehydration products of the cohydrolysis products of claim 1 in which $R^3$ is alkyl.
9. The method of preparing copolymers which comprises hydrolyzing by water any halogen and OR' groups present only of a silicohaloform derivative having the formula $$R^2_{3-x}SiHR_x$$

where R is selected from the group consisting of halogen and OR' and R' is a monovalent hydrocarbon group, $R^2$ is a monovalent hydrocarbon group, and $x$ is from 1 to 2, with a substituted silane having the formula $$R^4_{4-y}Si(OR^3)_y$$

where $R^3$ and $R^4$ are monovalent hydrocarbon groups and $y$ is from 1 to 3, the mole ratio of the silicohaloform derivative to the substituted silane being from 4:1 to 1:4.

10. The method of claim 9 in which R is halogen.
11. The method of claim 9 in which R is OR' and R' is a monovalent hydrocarbon group.
12. The method of claim 9 in which $R^3$ is alkyl.
13. The method of claim 9 including the step of codehydrating the hydrolysis products.
14. The copolymer of claim 1 where the silicohaloform derivative is ethyldichloro silane and the substituted silane is diethyl di-n-propoxysilane.
15. The copolymer of claim 1 where the substituted silane is hexyltriethoxy silane.
16. The copolymer of claim 1 where the silicohaloform derivative is ethyldiethoxysilane and the substituted silane is butyltriethoxysilane.
17. The copolymer of claim 1 where the silicohaloform derivative is ethyldiethoxysilane and the substituted silane is diallyl di-isobutoxysilane.
18. The copolymer of claim 1 where the substituted silane is allyl triethoxy silane.
19. The method of claim 9 where the silicohaloform derivative is ethyldichlorosilane and the substituted silane is diethyl di-n-propoxysilane.
20. The method of claim 9 where the substituted silane is hexyltriethoxy silane.
21. The method of claim 9 where the silicohaloform derivative is ethyldiethoxysilane and the substituted silane is butyltriethoxysilane.
22. The method of claim 9 where the silicohaloform derivative is ethyldiethoxysilane and the substituted silane is diallyl di-isobutoxysilane.
23. The method of claim 9 where the substituted silane is allyl triethoxy silane.

JOHN B. RUST.

References Cited in the file of this patent

UNITED STATES PATENTS

| Number | Name | Date |
|---|---|---|
| 2,258,218 | Rochow | Oct. 7, 1941 |
| 2,306,222 | Patnode | Dec. 21, 1942 |
| 2,377,689 | Hyde | June 5, 1945 |
| 2,380,995 | Rochow | Aug. 7, 1945 |
| 2,381,000 | Patnode et al. | Aug. 7, 1945 |
| 2,381,138 | Patnode et al. | Aug. 7, 1945 |
| 2,386,259 | Norton | Oct. 9, 1945 |
| 2,389,802 | McGregor | Nov. 27, 1945 |
| 2,406,605 | Hurd | Aug. 27, 1946 |
| 2,448,556 | Sprung et al. | Sept. 7, 1948 |
| 2,486,162 | Hyde | Oct. 25, 1949 |
| 2,511,296 | Rust | June 13, 1950 |

OTHER REFERENCES

Spielmann, Richter's Organic Chemistry, 2nd Ed. vol. I, page 284 (1919).